United States Patent
Massaru Amemiya

(10) Patent No.: US 10,091,487 B2
(45) Date of Patent: Oct. 2, 2018

(54) REAL IMAGE CAMCORDER, GLASS-FREE 3D DISPLAY AND PROCESSES FOR CAPTURING AND REPRODUCING 3D MEDIA USING PARALLEL RAY FILTERS

(71) Applicant: Roberto Massaru Amemiya, São Paulo (BR)

(72) Inventor: Roberto Massaru Amemiya, São Paulo (BR)

( * ) Notice: Subject to any disclaimer, the term of this patent is extended or adjusted under 35 U.S.C. 154(b) by 106 days.

(21) Appl. No.: 14/913,501

(22) PCT Filed: Aug. 22, 2014

(86) PCT No.: PCT/BR2014/000303
§ 371 (c)(1),
(2) Date: Feb. 22, 2016

(87) PCT Pub. No.: WO2015/024091
PCT Pub. Date: Feb. 26, 2015

(65) Prior Publication Data
US 2016/0205377 A1 Jul. 14, 2016

(30) Foreign Application Priority Data
Aug. 22, 2013 (BR) .................. 102013021423 0

(51) Int. Cl.
*H04N 13/214* (2018.01)
*H04N 13/167* (2018.01)
(Continued)

(52) U.S. Cl.
CPC ....... *H04N 13/214* (2018.05); *G02B 27/2214* (2013.01); *H04N 13/167* (2018.05);
(Continued)

(58) Field of Classification Search
CPC .......... G02B 27/2214; H04N 13/0296; H04N 13/0214; H04N 13/0497; H04N 13/0402; H04N 13/021; H04N 13/0051
(Continued)

(56) References Cited

U.S. PATENT DOCUMENTS 3,827,075 A * 7/1974 Baycura ................. G10K 11/24
 348/198
5,991,073 A 11/1999 Woodgate et al.
(Continued)

FOREIGN PATENT DOCUMENTS

EP  0 833 183 A1  4/1998
WO  WO 97/18677  5/1997

OTHER PUBLICATIONS

International Search Report for corresponding International Application No. PCT/BR2014/000303, dated Nov. 19, 2014, 5pp.
(Continued)

*Primary Examiner* — Thai Tran
*Assistant Examiner* — Jose Mesa
(74) *Attorney, Agent, or Firm* — Lewis Roca Rothgerber Christie LLP

(57) ABSTRACT

Parallel rays capture by a real image camcorder and capture emission by a real image television are made by parallel rays filter formed by multiple leveled liquid crystals with windows to filter distinct parallel rays in a field of vision. The image processing with image parameters is electronically carried out or by means of a device that displaces said image and controls a real image projection distance forwards or backwards a real image television. Introduction of a tridimensional image in a real image projection range is carried out by means of image reproduction with a distinct projection angle in a liquid crystal surface during a rays filtration step. Said tridimensional image introduced is controlled by a watcher.

9 Claims, 3 Drawing Sheets

Figure 1:
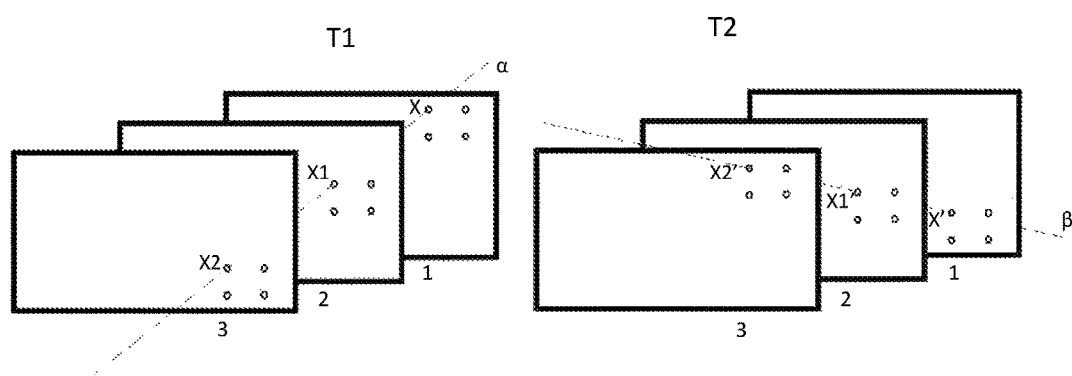

(51) Int. Cl.
*H04N 13/296* (2018.01)
*H04N 13/398* (2018.01)
*G02B 27/22* (2018.01)
*H04N 13/302* (2018.01)
*H04N 13/211* (2018.01)
*H04N 13/354* (2018.01)

(52) U.S. Cl.
CPC ......... *H04N 13/211* (2018.05); *H04N 13/296* (2018.05); *H04N 13/302* (2018.05); *H04N 13/354* (2018.05); *H04N 13/398* (2018.05)

(58) Field of Classification Search
USPC .......................................... 348/49
See application file for complete search history.

(56) References Cited

U.S. PATENT DOCUMENTS

| | | | |
|---|---|---|---|
| 6,483,643 B1* | 11/2002 | Zuchowski | G03B 21/56 359/443 |
| 7,750,981 B2 | 7/2010 | Shestak et al. | |
| 8,339,444 B2 | 12/2012 | Schultz et al. | |
| 2005/0062939 A1* | 3/2005 | Tamura | H04N 5/7416 353/69 |
| 2010/0039698 A1 | 2/2010 | Robinson et al. | |
| 2010/0045773 A1* | 2/2010 | Ritchey | G02B 13/06 348/36 |
| 2010/0289882 A1* | 11/2010 | Ohta | H04N 13/0497 348/51 |
| 2011/0175902 A1 | 7/2011 | Mahowald | |
| 2012/0013604 A1 | 1/2012 | Kang | |
| 2012/0140132 A1 | 6/2012 | Wu | |
| 2013/0152152 A1 | 6/2013 | Benyola | |
| 2013/0258070 A1 | 10/2013 | Corriveau et al. | |
| 2014/0125892 A1 | 5/2014 | Chen et al. | |

OTHER PUBLICATIONS

Written Opinion for corresponding International Application No. PCT/BR2014/000303, dated Nov. 19, 2014, 9pp.

Lanman, Douglas et al.; "Content-Adaptive Parallax Barriers: Optimizing Dual-Layer 3D Displays using Low-Rank Light Field Factorization"; acm Transactions on Graphics; Dec. 2010; vol. 29; No. 6; Proceedings of ACM SIGGRAPH Asia 2010, Seoul, South Korea; 13pp.

* cited by examiner

REAL IMAGE CAMCORDER, GLASS-FREE 3D DISPLAY AND PROCESSES FOR CAPTURING AND REPRODUCING 3D MEDIA USING PARALLEL RAY FILTERS

CROSS-REFERENCE TO RELATED APPLICATIONS

This application is a national phase application under 35 U.S.C. § 371 of International Application No. PCT/BR2014/000303, filed on Aug. 22, 2014, which claims the benefit of Brazilian Patent Application No. 102013021423 0, filed on Aug. 22, 2013, the disclosures of which are incorporated herein by reference in their entirety.

The present invention is related to a camcorder (also referred to as camera) that tri-dimensionally captures rays from a field of vision and is also related to a television that produces a real image, said camcorder and television using parallel rays filter devices formed by multiple leveled liquid crystals; yet, said invention is related to an image processing which is electronically carried out or carried out by means of a device to displace an image and to control a real image projecting distance forward and backwards relative the surface of a real image television; yet, said invention is related to the processing method to introduce a tridimensional image into a real image projecting field controlled by a watcher.

Currently camcorder and real image television exist to provide parallel rays filtration by means of two liquid crystals surface with a primary colors filter and electronic processing of a formed image into a CCD (charge-coupled device) in a camera (BR1020130135593).

The existing problems are: a parallel rays filter with primary colors light filter does not use colors of a real object; a real image processing does not control distance of a real image projection towards the frontal and back side of a real image television; and yet said processing does not bring a real image into the field of vision.

The solution for the parallel rays filter is to use multiple liquid crystal surfaces with small aligned windows to filter rays in the field of vision. Intermediary surfaces improve selection of parallel rays not requiring the use of primary colors filters. The solution to process a real image so as to control distance of a real image projection towards the front and back of a real image television monitor is to displace an image in the real image television image reproducing device relative to an image receptor central portion.

The solution to insert a real image into the field of vision of a real image television is an introduction by means of an image reproduction with a distinct vision angle in a liquid crystal surface during a step of rays filtration. The tridimensional image that became introduced is controlled by its depth and location by a watcher having its displacement altered relative to the central portion of an image reproducing device and also altering its overlaying relative to other images and its size.

A filter of parallel rays is formed by multiple liquid crystals surfaces. A ray should cross in straight line from the first to the last liquid crystal surface through open windows. Parallel rays are obtained by means of a set of windows. Windows synchronized movement will filter distinct rays in the field of vision in parallel. A set of windows quick movement should exist so that a visual impression that angles of all rays in the visual field are being filtered in the same time is obtained. The greater the number of leveled liquid crystals the closer the approach among surfaces and the closer the approach of open windows in a same surface.

The first electronic processing means of an image falling into a CCD in the real image camcorder is by image displacement with no direction inversion from up to down and from right to left. The image displacement direction should be the same in that parallel rays are projected. Image should always be displaced in a way that projection of a point from the vision field in the front of said real image camera is done towards a point relative to the real image television monitor. The image being processed displaced far away or close relative to the central portion of the parallel rays filter will determine projection forwards or backwards of an image capture plane in relation to a real image camera.

A second electronic processing means of an image falling into a real image camcorder CCD is by displacing the image reproduced in the image receptor. Rays issued by the image receptor should be filtered by a parallel rays filter of the same direction and opposite direction of the parallel rays filter in the camera. Filtered rays fall into a CCD. The falling image when displaced away apart or close relative to the CCD central portion will play the role of determining projection forwards or backwards the image capture plane in relation to the real image camera. Such image displacement can be done by moving apart the monitor surface relative to the CCD surface. The image displacement should be in such a way to maintain one point ahead from the real image camera and image reproduction one point relative to the real image television.

Real image insertion into the real image television field of vision is made by introducing an image into a translucent liquid crystal surface by means of image reproduction with a parallel rays filter distinct projection in a step of rays filtration of a image processing device or a real image television. The translucent liquid crystal set to insert a tridimensional image into a real image television projection range is made of an image reproduction device and a translucent liquid crystal reproducing device. Both said reproducing devices should be made of translucent liquid crystal. This image overlaying is carried out in the image reproducing device of an image processing device or in the real image television image reproducing device. A tri-dimensionally inserted image is obtained by means of a real image camcorder or by means of an image created by computer graph with a distinct projection angle for each angulation of the real image television parallel rays filter. Variation in the distance of an inserted tridimensional image in the field of vision up to a real image television is obtained by an image side displacement relative to an image receptor central portion. In order to obtain an impression of an object being located ahead or behind another object an overlaying of images inserted into said translucent liquid crystal sequentially should be carried out when so required.

Another way of overlaying images is made electronically by identifying contours of an object in an image by overlaying an image above another image. Reduction or enlargement of a tridimensional image should be carried out by varying distance far away or closer to a watcher, respectively.

Tridimensional graphic drawings may be introduced as being a field of vision with graphic objects. Such tridimensional image introduced is controllable by a watcher as it concerns to image depth, location and angulations by means of scanned commands with tri-dimensionally recorded images in various angles. Tridimensional images inserted into the field of vision are controlled by mouse, joysticks, sensitive gloves or any other cursor position control system. The following information is required to control real images synchronization: an image obtained from a parallel rays filter projection, moment in which said image was captured, filtered ray angulation relative to a perpendicular location of the parallel rays filter surface, direction (horizontal or vertical) and way (right or left side) of said filtered ray projection relative to the parallel ray filter surface.

The novelties are: several liquid crystal leveled surfaces to filter said parallel rays by having rays with original colors from those of rays coming from the field of vision; image processing having said real image projection controlled forwards and backwards relative to a real image television; and insertion of a tridimensional image into a field of vision of said real image television, said field of vision monitored by a watcher.

FIG. 1 schematically represents a filter of parallel rays using multiple liquid crystals (1, 2 and 3) and processes to obtain said parallel rays. The field of vision (having its end pointed to an object) is located in the upper portion of said figure. The filtered rays are located in the lower portion of said figure. In said FIG. 1 the drawing found in the left side represents a moment T1 and the drawing found in the right side represents a moment T2.

Number 1 represents a liquid crystal surface located in the front of said field of vision whereby parallel rays cross inside.

Number 2 represents a liquid crystal intermediary surface between frontal and rear surfaces and said intermediary surface may be one or more surfaces.

Number 3 represents a back liquid crystal surface whereby filtered parallel rays cross out.

Letter X represents a window in a liquid crystal surface (1) in a moment T1. Letter X' represents a window in another location in the same liquid crystal surface (1) in a moment T2.

Letter X1 represents a window in each liquid crystal intermediary surface (2) in a moment T1. Letter X1' represents a window in another location in the same surface (2) in a moment T2.

Letter X2 represents a window in a liquid crystal surface (3) in a moment T1. Letter X2' represents a window in another location in the same surface (3) in a moment T2.

Dotted line a represents a filtered light ray in a filter of parallel rays field of vision through windows X, X1 and X2 in a moment T1; and light ray β with different angulation from parallel rays field of vision through windows X', X1' and X2' in a moment T2.

Light ray α coming from the field of vision crosses through liquid crystals surfaces 1, 2 and 3 windows X, X1 and X2 respectively in a moment T1. Window X1 does not allow other rays crossing through window X to pass through when they are not directed to window X2. In said moment T2 windows movement occurs over said liquid crystals surfaces with ray β filtration, a ray which is distinct from ray α. Several windows positions in several moments will select distinct rays from the field of vision. Other windows sets in the liquid crystal surfaces carry out the same movements as those of windows X, X1 and X2 and thus select rays that are parallel to said sets. Quick window movements within a fraction of second should provide several filtered rays angles from the field of vision imparting a visual impression to a watcher that all filtered rays angles are being issued at the same time. The greater the number of intermediary surfaces (2) the more the windows set in the liquid crystal surfaces may become close thus improving concentration of parallel rays.

Figure 2:
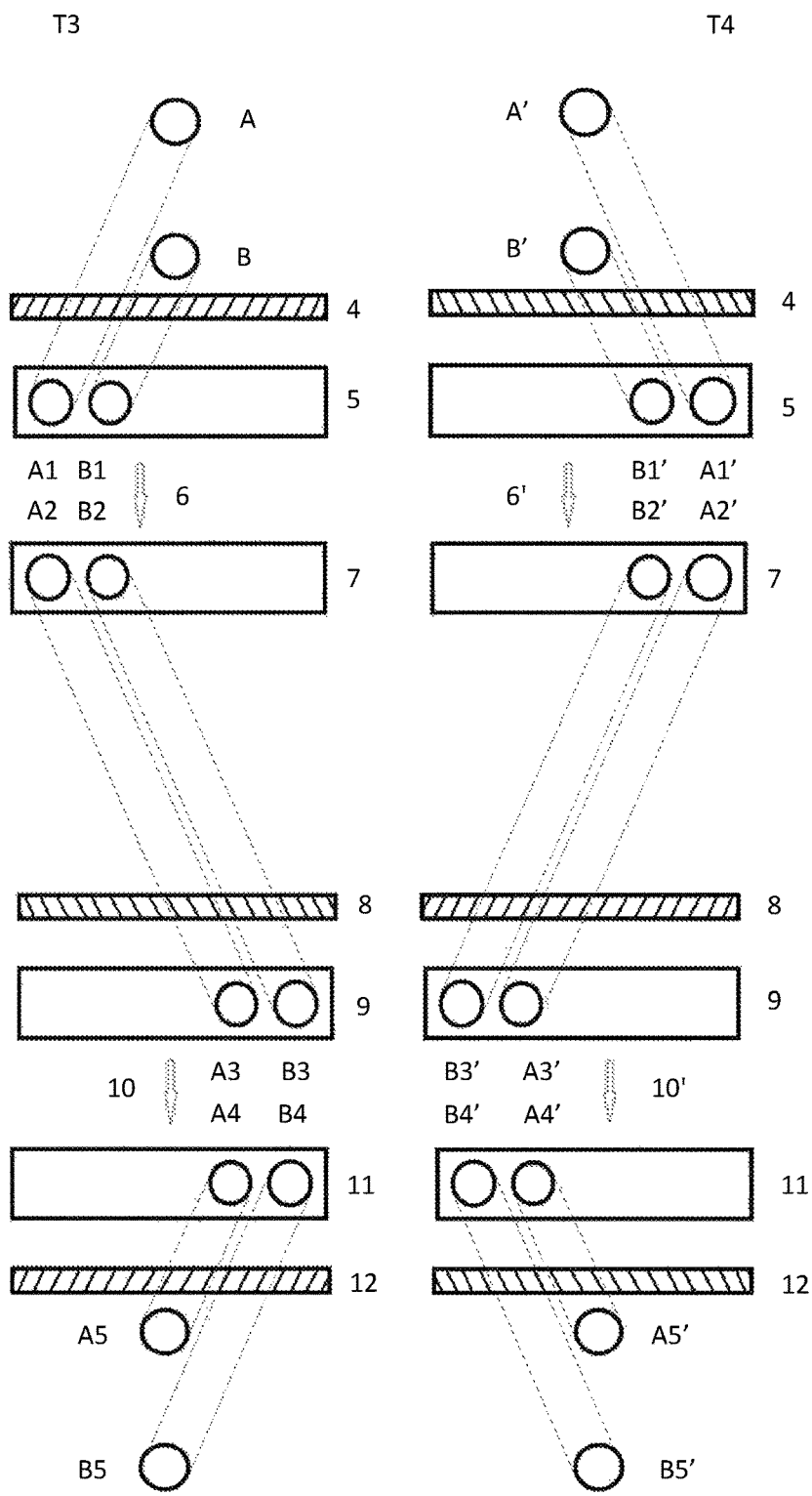

FIG. 2 schematically represents a real image camcorder (a-set formed by 4 and 5), an image processor (formed by 7, 8 and 9), a real image television (formed by 11 and 12) and the processes to obtain said items. The real image camcorder (having its end pointed to objects A and B) is located in the upper portion of said figure. The real image television (having its end pointed to a watcher) is located in the lower portion of said figure. In FIG. 2 the left side drawing represents a moment T3 and the drawing in the right side represents a moment T4.

Number 4 represents a filter of parallel rays formed by several liquid crystals.

Number 5 represents a CCD.

Number 6 represents an image transmission by means of photoelectric impulses from said CCD towards an image receptor.

Number 7 represents an image receptor.

Number 8 represents a filter of parallel rays formed by several liquid crystals.

Number 9 represents a CCD.

Number 10 represents an image transmission by means of photoelectric impulses to a recording or to a real image television.

Number 11 represents an image receptor.

Number 12 represents a filter of parallel rays formed by several liquid crystals.

Letter A is a real object which is positioned behind another real object as letter B in a moment T3.

Letter A' is a real object which is positioned behind another real object as letter B' in a moment T4.

Letters A1 and B1 represent falling of an image into said CCD surface (5) with rays filtered by said filter of parallel rays (4) in a real image camcorder, said rays originated from real objects A and B in a moment T3.

Letters A1' and B1' represent falling of an image into said CCD surface (5) from rays filtered by said filter of parallel rays (4) in a real image camcorder originated from real objects A' and B' in a moment T4.

Letters A2 and B2 represent an image reproduction in the image receptor (7) of photoelectric impulses coming from said CCD (5) from images A1-B1 in a moment T3.

Letters A2' and B2' represent image reproduction in the photoelectric impulses (6) image receptor (7), said impulses coming from said CCD (5) of image A1'-B1' in a moment T4.

Letters A3 and B3 represent falling of an image into the CCD (9) surface from the rays filtered by a filter of parallel rays (8) originated from filtration of rays coming from image A2-B2 in an image reproduction device (7) in a moment T3.

Letters A3' and B3' represent falling of image into a CCD (9) surface of rays filtered by said filter of parallel rays (8) coming from filtration of rays originated from image A2'-B2' in an image reproducing device (7) in a moment T4.

Letters A4 and B4 represent an image formed in a real image television image receptor (11), said images coming from photoelectric impulses from said CCD (9) in image A3-B3 in a moment T3.

Letters A4' and B4' represent an image formed in a real image television image receptor (11) coming from said CCD (9) photoelectric impulses from image A3'-B3' in a moment T4.

Letters A5 and B5 represent projection of rays formed in a space in front of said real image television, such rays originated from image A4-B4 in the receptor (11) after said rays have crossed through said filter of parallel rays (12) in a moment T3.

Letters A5' and B5' represent projection of rays formed in a space in front of said real image television, such rays originated from image A4'-B4' in the receptor (11) after said rays have crossed through said filter of parallel rays (12) in a moment T4.

Said real image television imparts a perception to a watcher of rays crossing in said moments T3 and T4 when said rays are issued in a fraction of a second so as to form a real image (A5, B5, A5' and B5').

Said real objects A and B, in a moment T3, issue rays that cross through said filter of parallel rays (4) with an inclination to the left side. Said parallel rays fall into said CCD (5) forming an image A1-B1. The image is formed in the CCD (5) surface and the object is located farther on the left side. CCD (5) photo-electronic impulses (6) transmission reproduces an image in the image receptor (7). Filtration of rays issued by the image receptor (7) is carried out by another filter of parallel rays (8) with an opposing angulation relative to said filter of rays (4). Such filtration of parallel rays produces an image A3-B3 in said CCD (9). CCD (9) photo-electronic impulses are then sent to said real image television. An image reproducing device (11) reproduces an image A4-B4 that produces rays passing through said parallel rays filter (12) with the same angulation as that of said filter of rays (4). Rays issued by said real image television have the same features as those rays filtered in the real image camcorder. In a moment T4 the parallel rays filter inclination is directed to the right side and then the full process is now repeated. In additional moments distinct parallel rays are filtered from said field of vision, thus carrying out a full process as described in FIG. 2. Distinct parallel rays issued in a fraction of a second impart to a watcher an impression that the television projection range is filled by distinct parallel rays at the same time. Perception of all distinct parallel rays at the same time by said watcher enables him/her to have an impression that a real object is projected in the front of and in the back of said real image television.

Figure 3:
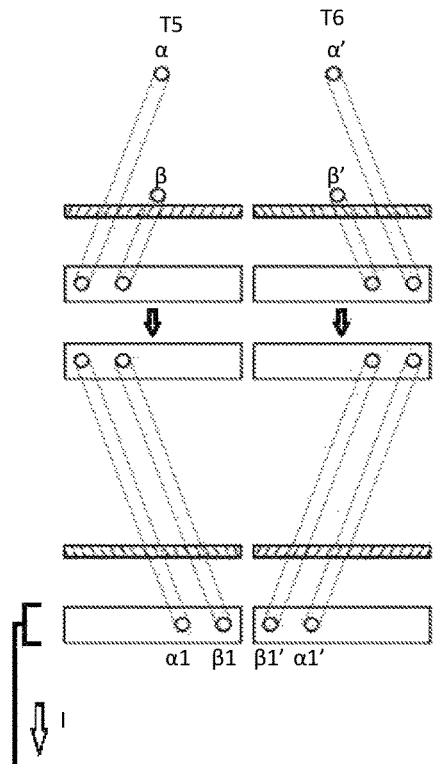

FIG. 3 schematically represents a real image camcorder that shows four real objects in the field of vision ($\alpha$, $\beta$, $\alpha'$ and $\beta'$) in the upper portion. In the real image television projection range images are shown in the lower portion ($\alpha 1$-$\beta 1$ and $\alpha 1'$-$\beta 1'$). An arrow (I) represents transmission of an image to said real image television image receptor (13) so as to insert a tridimensional image (13, 14 and 15).

Figure 4:
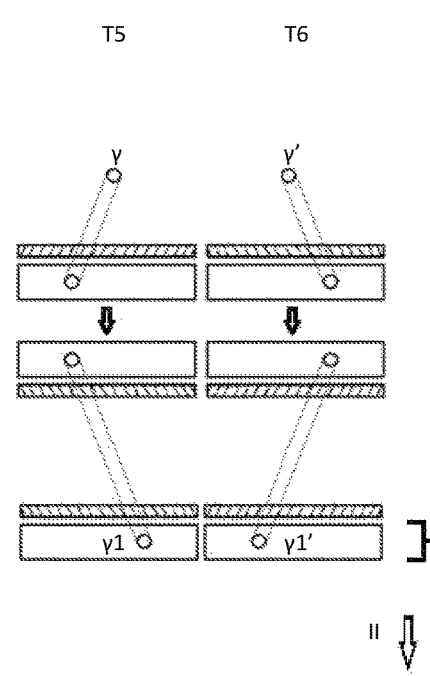

FIG. 4 schematically represents a real image camcorder that shows two real objects ($\gamma$ and $\gamma'$) in the upper portion. In the real image television projection range an image of angular projection is shown in the filtered rays ($\gamma 1$ and $\gamma 1'$) in the upper portion. An arrow (II) represents an image transmission to a translucent image receptor (14) in said real image television with insertion of a tridimensional image (a set formed by 13, 14 and 15).

Figure 5:
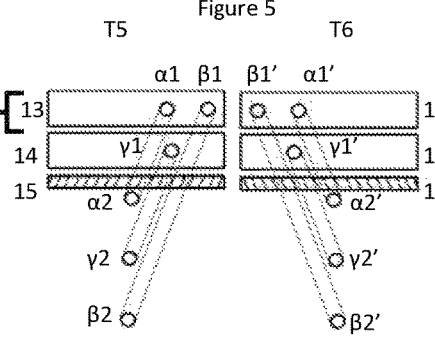

FIG. 5 schematically represents a real image television with insertion of a tridimensional image (a set formed by 13, 14 and 15) including a tridimensional projection image ($\gamma 1$ and $\gamma 1'$) in the translucent liquid crystal surface (14); FIG. 5 also represents processes to obtain inclusion of a tridimensional image into said real image television projection range. An image receptor (13) is located in FIG. 5 upper portion. Said translucent liquid crystal image receptor with image reception (14) is overlaid on an image receptor (13). A filter of parallel rays (15) is located in the lower portion of said figure. Left side in the drawing represents a moment T5 and right side represents moment T6.

Number 13 represents an image receptor.
Number 14 represents a translucent liquid crystal image receptor.
Number 15 represents a filter of parallel rays with multiple liquid crystals.

Letter $\alpha 1$ is an image corresponding to a real object farther from a real image camera in a moment T5.

Letter $\alpha'$ is an image corresponding to a real object farther from a real image camera in a moment T6.

Letter $\beta 1$ is an image corresponding to a real object closer to a real image camera in a moment T5.

Letter $\beta$ is an image corresponding to a real object closer to a real image camera in a moment T6.

Letter $\gamma 1$ is an image reproduced into a translucent liquid crystal originated from another real image camcorder to insert a tridimensional image (FIG. 4) or to insert a tridimensional computer graphic with angular projection matching said real image television parallel rays filter angular projection in a moment T5.

Letter $\gamma 1'$ is an image reproduced into a translucent liquid crystal and originated from another real image camera to insert a tridimensional image (FIG. 4) or to insert a tridimensional computer graphic with angular projection matching said real image television parallel rays filter angular projection in a moment T6.

Letters $\alpha 2$, $\beta 2$ and $\gamma 2$ and $\alpha 2'$, $\beta 2'$ and $\gamma 2'$ are projections of images formed by parallel rays originated when passing through said filter of parallel rays (15) in said images $\alpha 1$-$\beta 1$ and $\gamma 1$ and $\alpha 1'$-$\beta 1'$ and $\gamma 1'$ in said moments T5 and T6 respectively.

Said real image television with insertion of tridimensional image imparts a perception to a watcher of rays crossing in said moments T5 and T6 while said rays are issued in a fraction of a second to form real images ($\alpha 2$, $\beta 2$ and $\gamma 2$ and $\alpha 2'$, $\beta 2'$ and $\gamma 2'$).

In said moment T5 said real image television with insertion of a tridimensional image shows an image receptor (13) with an image $\alpha 1$-$\beta 1$ originated from real objects ($\alpha$ and $\beta$) from a real image camera (FIG. 3) after image is processed. Said translucent image receptor (14) receives an image ($\gamma 1$) originated from said image camera to insert a tridimensional image (FIG. 4) or to insert a tridimensional computer graphic with angular projection matching said real image television filter of parallel rays angular projection. An image ($\gamma 1$) in said translucent image receptor (14) has a projection with the same angulation as that of said real image camera filter of parallel rays projection. An overlaying of image $\gamma 1$ on image $\alpha 1$-$\beta 1$ occurs. Filter of parallel rays (15) filters rays originated from image $\gamma 1$ overlaid on image $\alpha 1$-$\beta 1$. In a moment T6 filter of parallel rays inclination is directed to an angulation opposed to T5 and the full filtration process is repeated with objects $\alpha'$, $\beta'$ and $\gamma 1$. In different moments distinct parallel rays from said field of vision are filtered thus carrying out the full process described in FIGS. 3 and 5. Distinct parallel rays issued in a fraction of a second gives a watcher an impression that said distinct parallel rays fill up the real image television projection range at the same time.

To insert a tridimensional real image behind said $\alpha 2$ image in said moment T5 said image $\gamma 1$ should be displaced to the left side relative to $\alpha 1$ and in moment T6 image $\gamma 1'$ should be displaced to the right side relative to $\alpha 1'$ with a decrease in images $\gamma 1$ and $\gamma 1'$ dimensions. To insert a tridimensional real image in front of image $\beta 2$ in a moment T5 said image $\gamma 1$ should be displaced to the right side relative to $\beta 1$ and in said moment T6 image $\gamma 1'$ should be displaced to the left side relative to $\beta 1'$ with an increase in images $\gamma 1$ and $\gamma 1'$ dimensions. A tridimensional image when inserted into said real image television projection range should be located either behind or in front of relative to any other image in the real image television translucent liquid crystals with insertion of a tridimensional image in case it is further or closer relative to said any other image.

The expressions "camcorder" and "camera" are used in this patent application specification as having equivalent meanings.

The invention claimed is:

1. An optical system for capturing and reproducing three dimensional (3D) images comprising:
 a camcorder including:
  a first filter for generating first parallel rays at a first angle, from a field of vision of an object located at a first location with respect to a central axis of the system, and
  a first CCD for capturing the first parallel rays from the first filter displaced at a location to one side of the first location by the first angle;
 an image processor for processing the captured first parallel rays including:
  a second filter for generating second parallel rays at a second angle opposite to the first angle with respect to the central axis of the system and displaced at a location opposite side of the first location with respect to the central axis of the system by the second angle, from the captured first parallel rays, and
  a second CCD for capturing the second parallel rays from the second filter displaced at the second angle; and
 a television for reproducing images including:
  a third filter for generating third parallel rays at the first angle placed at the first location with respect to a central axis of the system by the first angle, from the captured second parallel rays, and
  a display for displaying a real image, wherein
 each of the first, second and third filters include a first movable liquid crystal surface, a second movable liquid crystal surface and a third movable liquid crystal surface, and wherein
 the image processor controls the movements of the first, second and third movable liquid crystal surfaces of each of the first, second and third filters to continuously vary the first and second angles over time to form a real image in a front and in a back of said display to provide a perception of a 3D image displayed by said television.

2. The optical system of claim 1, wherein each of said first, second and third movable liquid crystal surfaces is provided with plurality of windows with opening and the opening of windows provide selection of one ray and several sets of windows select parallel rays.

3. The optical system of claim 1, wherein said camcorder captures rays originated from the object in all angles of irradiation in the field of vision of said camcorder by the first filter.

4. The optical system of claim 1, wherein said television reproduces rays with the same features of the rays originated from the object to form a real image in the front and in the back of said television.

5. The optical system of claim 1, wherein said first CCD forms a second image that moves on with the variation of the first angle, and the second CCD forms a third image that moves on with the variation of the second angle opposite to the first angle forming another image with displacement sent to the television.

6. The optical system of claim 5, wherein a center portion of the second image is located in a projection of a central ray direction of the first filter.

7. The optical system of claim 1, wherein the real image in the front and in the back of said display is formed by an image created by a computer graph with a distinct projection angle for each angulation in the third filter.

8. The optical system of claim 1, wherein a central portion of an image formed by the first parallel rays from the first filter displaced at a location to one side of the first location in a central ray direction projection of the first parallel rays.

9. The optical system of claim 1, wherein the real image formed in a front and in a back of said display is obtained by a graphic processing with a distinct image from each projection field in the third filter.

* * * * *